US008346607B1

(12) United States Patent  (10) Patent No.: US 8,346,607 B1
Benson et al.                  (45) Date of Patent: ＊Jan. 1, 2013

(54) AUTOMATIC ADJUSTMENT OF ADVERTISER BIDS TO EQUALIZE COST-PER-CONVERSION AMONG PUBLISHERS FOR AN ADVERTISEMENT

(75) Inventors: Scott S. Benson, Sunnyvale, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,173

(22) Filed: Apr. 2, 2012

Related U.S. Application Data

(63) Continuation of application No. 11/830,728, filed on Jul. 30, 2007, now Pat. No. 8,175,914.

(51) Int. Cl.
*G06Q 30/00* (2012.01)
(52) U.S. Cl. ............... 705/14.71; 705/4; 705/45; 705/6; 705/41
(58) Field of Classification Search ................ 705/14.71
See application file for complete search history.

(56) References Cited

U.S. PATENT DOCUMENTS

| | | | | |
|---|---|---|---|---|
| 6,006,197 | A * | 12/1999 | d'Eon et al. ................ | 705/14.45 |
| 6,285,999 | B1 | 9/2001 | Page | |
| 7,039,599 | B2 * | 5/2006 | Merriman et al. ......... | 705/14.52 |
| 7,406,434 | B1 | 7/2008 | Chang et al. | |
| 2002/0026352 | A1 | 2/2002 | Murata | |
| 2003/0135460 | A1 | 7/2003 | Talegon | |
| 2005/0097204 | A1 * | 5/2005 | Horowitz et al. ............. | 709/223 |
| 2005/0144067 | A1 * | 6/2005 | Farahat et al. ................. | 705/14 |
| 2006/0004628 | A1 | 1/2006 | Axe et al. | |
| 2006/0122879 | A1 * | 6/2006 | O'Kelley ........................ | 705/14 |
| 2006/0212350 | A1 | 9/2006 | Ellis et al. | |
| 2006/0248035 | A1 * | 11/2006 | Gendler et al. .................... | 707/1 |
| 2007/0055569 | A1 | 3/2007 | Subramanian et al. | |
| 2007/0112656 | A1 * | 5/2007 | Howe et al. ..................... | 705/35 |
| 2007/0156887 | A1 | 7/2007 | Wright et al. | |
| 2007/0157229 | A1 * | 7/2007 | Heathcock ....................... | 725/34 |
| 2007/0179849 | A1 | 8/2007 | Jain | |
| 2008/0097813 | A1 * | 4/2008 | Collins et al. ..................... | 705/8 |
| 2008/0275770 | A1 | 11/2008 | Kitts | |
| 2009/0099902 | A1 * | 4/2009 | Chatter et al. .................. | 705/10 |
| 2010/0010865 | A1 * | 1/2010 | Dyer ................................ | 705/10 |
| 2010/0138291 | A1 * | 6/2010 | Silverman et al. ......... | 705/14.45 |
| 2012/0130798 | A1 * | 5/2012 | Cooley et al. .............. | 705/14.41 |

* cited by examiner

*Primary Examiner* — Elizabeth Rosen
*Assistant Examiner* — Joan Goodbody
(74) *Attorney, Agent, or Firm* — Fish & Richardson P.C.

(57) ABSTRACT

A learning model is built on a combination of advertiser, publisher and user data. The learning model can be applied to all advertisers in an advertising system. The learning model provides predicted conversion rates for a given advertisement ("ad") appearing on different publisher networks. A predicted conversion rate represents the probability that a click on a given ad appearing on a given publisher will lead to a conversion. The predicted conversion rates are used to generate a multiplier. The multiplier is used to automatically adjust the advertiser's bid (e.g., maximum cost-per-click (CPC)) for the given ad prior to an auction for the ad. Adjusting the advertiser's bid equalizes a cost-per-conversion among the publishers for the ad.

20 Claims, 4 Drawing Sheets

AUTOMATIC ADJUSTMENT OF ADVERTISER BIDS TO EQUALIZE COST-PER-CONVERSION AMONG PUBLISHERS FOR AN ADVERTISEMENT

CROSS-REFERENCE TO RELATED APPLICATIONS

This application is a continuation of U.S. application Ser. No. 11/830,728, titled "Automatic Adjustment of Advertiser Bids to Equalize Cost-Per-Conversion Among Publishers For an Advertisement," filed Jul. 30, 2007, the disclosure of which is incorporated herein by reference in its entirety. The subject matter of this application is generally related to the following U.S. Patent Applications: U.S. patent application Ser. No. 10/712,263, for "Targeting Advertisements Based on Predicted Relevance of the Advertisements," filed Nov. 14, 2003; U.S. patent application Ser. No. 10/880,972, for "Adjusting Ad Costs Using Document Performance Or Document Collection Performance," filed Jun. 30, 2004; and U.S. patent application Ser. No. 11/321,046, for "Predicting Ad Quality," filed Dec. 30, 2005.

TECHNICAL FIELD

The subject matter of this application is generally related to advertising.

BACKGROUND

Interactive media (e.g., the Internet) has great potential for the targeting of advertisements ("ads") to receptive audiences. One form of online advertising is ad syndication, which allows advertisers to extend their marketing reach by distributing ads to additional partners. For example, third party online publishers can place an advertiser's text or image ads on web properties with desirable content to drive online customers to the advertiser's website. An example of such a system is AdSense™ offered by Google, Inc.

A "conversion" occurs when a customer performs a certain action at the advertiser's website (e.g., registering, making a purchase, downloading content, providing information, clicking on a link). A conversion can be defined by the advertiser. Cost-Per-Action (CPA) for an advertiser is defined as the dollar cost for a conversion. Everything else being equal, an advertiser desires to have a low CPA for an ad. A click on a first ad displayed by a first publisher may have a higher chance of converting than a click on the same ad displayed by a second publisher. For example, an ad clicked on "Google.com" may have a higher probability of converting than the same ad clicked on a publisher network (e.g., the AdSense™ network). Thus, a click on an ad presented by a first publisher may be worth more than a click on the same ad presented by a second publisher. Therefore, ideally, the advertiser should bid less for the second publisher click than the first publisher click, and so the CPA paid by the advertiser would be the same for both publishers.

SUMMARY

A learning model is built on a combination of advertiser, publisher and user data. The learning model can be applied to all advertisers in an advertising system. The learning model provides predicted conversion rates for a given ad appearing on different publishers. A predicted conversion rate represents the probability that a click on a given ad appearing on a given publisher network will lead to a conversion. The predicted conversion rates are used to generate a multiplier. The multiplier is used to automatically adjust the advertiser's bid (e.g., maximum cost-per-click (CPC)) for the given ad prior to an auction for the ad. Adjusting the advertiser's bid equalizes a cost-per-conversion among the publishers for the ad.

Other implementations are disclosed, including implementations directed to systems, methods, apparatuses, computer-readable mediums and user interfaces.

DETAILED DESCRIPTION

Advertising System Overview

Figure 1:
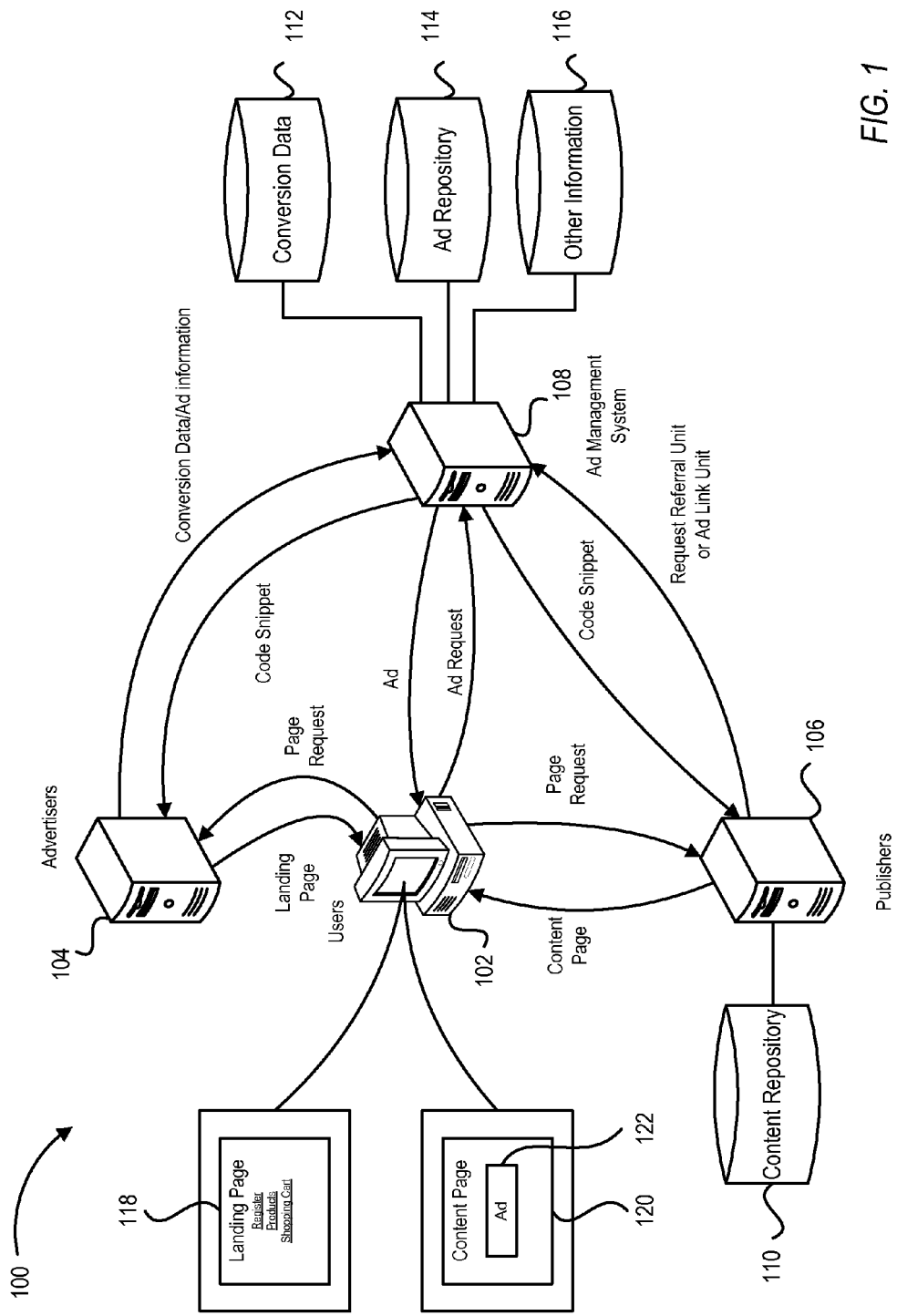
FIG. 1 is a block diagram of an example online advertising system.

FIG. 1 is a block diagram of an example online advertising system 100. In some implementations, one or more advertisers 104 can directly, or indirectly, enter, maintain, and track advertisement ("ad") information in an ad management system 108. The ads can be stored in a repository 114 coupled to the system 108 (e.g., a MySQL® database). The ads may be in the form of graphical ads, such as banner ads, text only ads, image ads, audio ads, video ads, ads combining one of more of any of such components, etc. The ads may also include embedded information, such as embedded media, links, meta-information, and/or machine executable instructions. One or more publishers 106 may submit requests for ads or ad link units to the system 108. The system 108 responds by sending ads, ad link units, or information that will allow for the retrieval of ads or ad link units to the requesting publisher 106 for placement/serving on one or more of the publisher's web properties (e.g., websites, media channels, network-distributed content). The ads or ad link units can be placed with or embedded in the publisher's content (e.g., videos, articles, search results), which can be stored in a repository 110. The ads or ad link units can also be placed with or embedded in content received from other sources (e.g., other publishers, advertisers).

In some implementations, a publisher's properties available in the system 100 may also include Internet-distributed and broadcast distributed content, including but not limited to: television spots, radio spots, print advertising, billboard advertising (electronic or printed), on-vehicle advertising, and the like.

Other entities, such as users 102 and advertisers 104, can provide usage information to the system 108, such as, for example, whether or not a conversion or click-through related to an ad has occurred. In some implementations, conversion data can be stored in a repository 112, where it can be used by the system 108 to improve ad targeting performance and to automatically adjust an advertiser's bids prior to an ad auction, as described in reference to FIGS. 2 and 3. The usage information provided to the system 108 can include measured or observed user behavior related to ads that have been served. In some implementations, the system 108 performs financial transactions, such as crediting the publishers 106 and charging the advertisers 104 based on the usage information.

A computer network, such as a local area network (LAN), wide area network (WAN), the Internet, wireless network or a combination thereof, can connect the advertisers 104, the system 108, the publishers 106, and the users 102.

One example of a publisher 106 is a general content server that receives requests for content (e.g., articles, electronic mail messages, discussion threads, music, video, graphics, networked games, search results, web page listings, information feeds, dynamic web page content, etc.), and retrieves the requested content in response to the request. The content server may submit a request (either directly or indirectly) for ads or ad link units to an ad server in the system 108. The ad request may include a number of ads desired. The ad link unit request may include a number of ad link units desired and the number of ad links per ad link unit. The ad or ad link unit request may also include content request information. This information can include the content itself (e.g., page or other content document), a category or keyword corresponding to the content or the content request (e.g., arts, business, computers, arts-movies, arts-music, etc.), part or all of the content request, content age, content type (e.g., text, graphics, video, audio, mixed media, etc.), geo-location information, demographic information related to the content, keyword, web property and the like.

In some implementations, the content server (or a browser rendering content provided by the content server) can combine the requested content with one or more of the ads or ad link units provided by the system 108. The combination can happen prior to delivery of the content to the user or contemporaneously where the advertising server can serve the ads or ad link units directly to an end user. The combined content and ads or ad link units can be delivered to the user 102 that requested the content for presentation in a viewer (e.g., a browser or other content display system). The content server can transmit information about the ads or ad link units back to the ad server of the ad manager 108, including information describing how, when, and/or where the ads or ad link units are to be rendered (e.g., in HTML or JavaScript™). The content page 120 can be rendered in the user's viewer with one or more ads 122. In one example scenario, when the user 102 clicks on a displayed ad 122 of an advertiser, the user 102 can be redirected to a landing page 118 of the advertiser's web site.

In some implementations, the publisher 106 is a search service (e.g., "Google.com"). A search service can receive queries for search results. In response, the search service can retrieve relevant search results from an index of content (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of search results (e.g., ten).

The search service can submit a request for ads or ad link units to the system 108. The request may include a number of ads or ad link units desired. An ad link unit request may include a number of ad link units desired and the number of ad links per ad link unit. The number of ads or number of ad link units may depend on the search results, the amount of screen or page space occupied by the search results or other content to be displayed contemporaneously with the sponsored content, the size and shape of the ads, etc. In some implementations, the number of desired ads can be from one to ten, or from three to five. In some implementations, the number of desired ad link units can be greater than one (e.g., three). The request for ads or ad link units may also include a query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. Other information can be included in the request including information related to the content that is to be displayed contemporaneously with the sponsored content. In some implementations, IR scores can be computed from, for example, dot products of feature vectors corresponding to a query and a document, page rank scores, and/or combinations of IR scores and page rank scores, etc.

A search service can combine the search results with one or more of the ads or ad link units provided by the system 108. This combined information can then be forwarded/delivered to the user 102 that requested the content. The search results can be maintained as distinct from the ads or ad link units, so as not to confuse the user between paid advertisements and presumably neutral search results. The search service can transmit information about the ad or ad link unit and when, where, and/or how the ad or ad link unit was to be rendered back to the system 108.

As can be appreciated from the foregoing, the advertising management system 108 can serve publishers 106, such as content servers and search services. The system 108 permits serving of ads targeted to content (e.g., documents, web pages, web blogs, etc.) served by content servers. For example, a network or inter-network may include an ad server serving targeted ads in response to requests from a search service with ad spots for sale. Suppose that the inter-network is the World Wide Web. The search service can be configured to crawl much or all of the content. Some of this content will include ad spots (also referred to as "inventory") available. In this example, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

Example System

Figure 2:
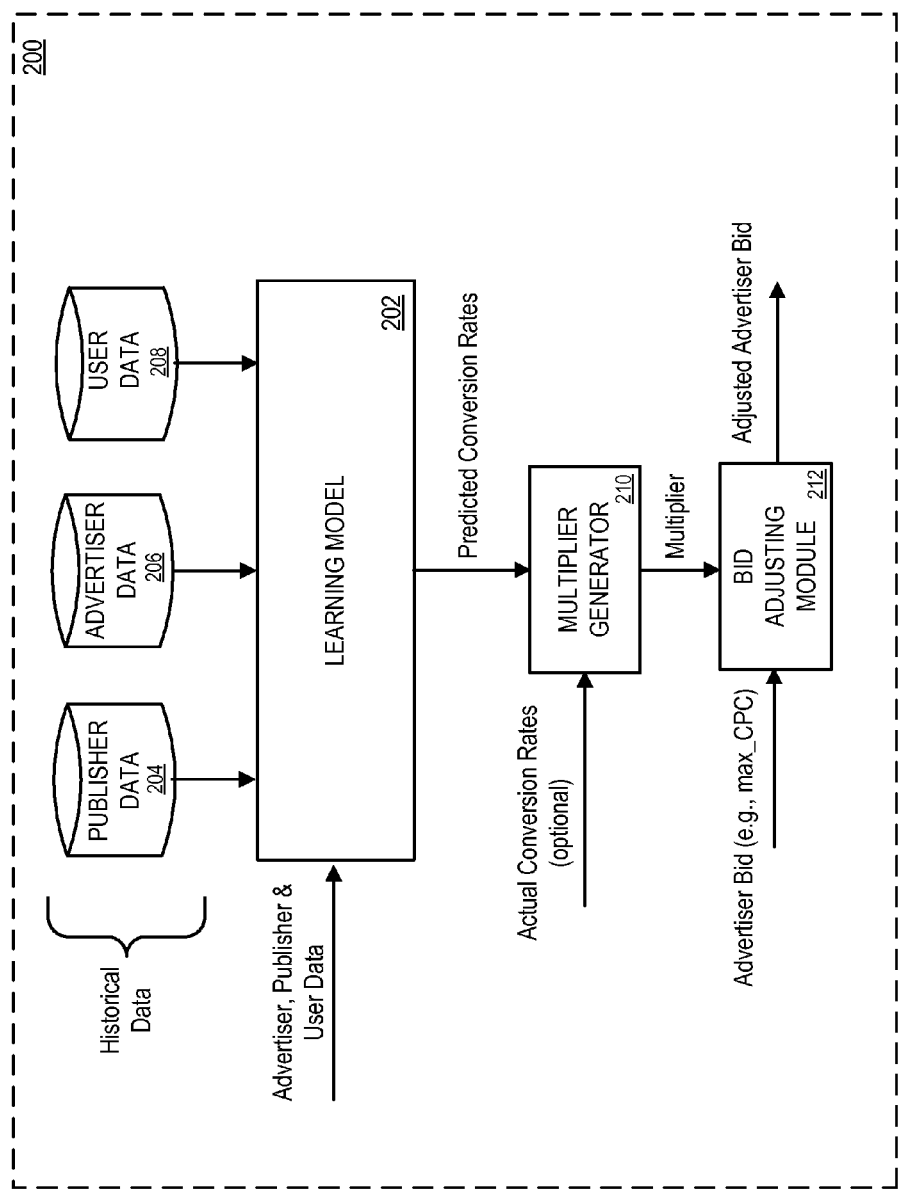
FIG. 2 is a block diagram of an example system for automatically equalizing cost-per-conversion between publishers.

FIG. 2 is a block diagram of an example system 200 for automatically equalizing cost-per-conversion between publishers. In some implementations, the system 200 includes a learning model 202, one or more repositories 204, 206, 208, for storing historical data, a multiplier generator 210 and a bid adjusting module 212. In the example shown, the historical data includes publisher data 204, advertiser data 206 and user data 208.

In an exemplary operation, the learning model 202 is built using the advertiser, publisher and user data stored in repositories 204, 206 and 208. For a given advertiser, publisher and user, the learning model 202 can generate a predicted conversion rate for a given ad. In online advertising, a conversion rate can be defined as a percentage of unique visitors who take a desired action upon visiting a web property. The desired action may be submitting a sales lead, making a purchase, viewing a key page of the site, downloading a whitepaper, or some other action. The ad management system 108 can compute an average CPA that is incurred by each ad.

In some implementations, it is desirable to predict the conversion rate P(conversion|click, ad, publisher, user) for every possible publisher, advertiser, user data combination associated with an online advertising system (e.g., system 100). Such a prediction could be made using raw counts of conversions and clicks taken from, for example, click or conversion logs. In practice, however, conversion data for all advertisers may not be available. Even if conversion data is available for a given advertiser, there may be insufficient statistics available for every possible publisher network where a given ad may appear, and the conversion counts for many (advertiser, publisher) pairs may be too low to provide accurate conversion rate predictions. User data can be related to general characteristics of the user (e.g., language, country), so as to protect the identity of the user or other personal information.

The issues described above suggest the use of a machine learning model to predict conversion rates rather than using raw conversion counts. In FIG. 2, the learning model 202 can generalize over features on observed data. Thus, even if there is no data for a specific (advertiser, publisher) pair, the learning model 202 can use data from similar (advertiser, publisher) pairs to provide a reasonable prediction of a conversion rate for a given ad. The learning model 202 can be applied to all advertisers participating in an online advertising system, including conversion tracked advertisers and non-conversion tracked advertisers.

In some implementations, a large scale machine learning system can be used to build the learning model 202 based on click and conversion log data. The prediction conversion rate P can be given by the probability function $$P(conversion|click, ad, publisher, user), \quad [1]$$

which can be interpreted as the probability that conversion will result from a click for a given ad, publisher and user combination. Once the learning model 202 is built the multiplier generator 210 can generate a multiplier using the prediction conversion rates. An example multiplier M for a particular ad presented to a particular user on Publisher A, can be given by $$M(\text{ad, publisher } A, \text{user}) = \quad [2]$$
$$\min\left(1.0, \frac{P(\text{conversion} | \text{click, ad, Publisher } A, \text{user})}{P(\text{conversion} | \text{click, ad, Publisher } B, \text{user})}\right).$$

Using equation [2] the multiplier M can be computed for a given ad from a ratio of a predicted conversion rate for Publisher A and a predicted conversion rate for Publisher B. The predicted conversion rates for the publishers can be obtained from the same or different learning models. Publisher A could be, for example, a publisher on the AdSense™ network, and Publisher B could be, for example, "Google.com." If Publisher B has a predicted conversion rate that is higher than Publisher A, the multiplier M will be a number less than one. Using equation [2], the multiplier M can never be greater than one due to the min( ) operator. If the computed ratio is greater than one, then the ad management system 108 can optionally cap the computed ratio to one to avoid exceeding the advertiser's stated maximum CPC bid. In some cases, however, the multiplier M can be greater than one, depending on the predicted conversion rates for Publisher A and Publisher B. In such cases, the multiplier M can be given by:

$$M(\text{ad, publisher } A, \text{user}) = \frac{P(\text{conversion} | \text{click, ad, Publisher } A, \text{user})}{P(\text{conversion} | \text{click, ad, Publisher } B, \text{user})} \quad [3]$$

Equations [2] and [3] are examples of how to compute a multiplier. Other multipliers are possible. Equation [2] can be adapted for any number of publishers participating in an online advertising system 100.

In some implementations, the multiplier M can be used by the bid adjusting module 212 to automatically adjust an advertiser's bid. For example, the multiplier M can be used to adjust downward (or upward) the advertiser's maximum cost-per-click (CPC) bid for a given ad presented on a first publisher relative to a second publisher or other reference value. The bid can be automatically adjusted prior to its submission in an ad auction, such as an AdSense™ ad auction. Adjusting the advertiser's bid effectively equalizes the CPAs between two or more publishers. In the preceding example, Publisher A is less valuable to the advertiser than Publisher B because Publisher A has a lower conversion rate for the same ad. Therefore, using the above scheme the advertiser will bid less for a conversion on the Publisher A network.

Building the Model

In some implementations, the learning model 202 is trained on ads that are conversion tracked by, for example, the ad management system 108. Each instance of training data can correspond to an ad that received a click. Clicks associated with spam can be filtered out of the training data. Each data instance can be labeled as to whether the data instance eventually lead to a conversion. For each instance a set of advertiser, publisher and user features can be extracted. Some examples of features include but are not limited to: ad dimensions, ad type (e.g., image ad, text), the displayed position in an ad block (e.g., top position), the number of ads in an ad block, the ad block containing the ad displayed in a publisher's URL, the publisher's web domain, the publisher's page language, the publisher's country, the advertiser's URL, the advertiser's domain, the advertiser's page language, the advertiser's country, the day of week, the user's country, the user's city, keywords, scores (e.g., score of how relevant the ad is for a given page), a set of ad keywords that matched words in the publisher's page, a set of words in the displayed ad creative text, the conversion rate for the advertiser, the multiplier for the publisher, the predicted conversion rate for a reference publisher (e.g., the advertiser's Google.com conversion rate), the predicted click-through-rate (CTR) for the ad on the publisher, words on the publisher page, etc. Other features are possible.

In some implementations, the advertiser's URL and domain can be omitted from the advertiser feature set prior to training the learning model. In some cases, the conversion data may be noisy. In some instances, there are advertisers who do not conversion track. To train on clean data, training can be performed only on ads for which there is a confident conversion rate based on raw conversion counts. Depending on the machine learning algorithm used, more weight can be given to recent training data, so that it presents a stronger influence on the learning model.

Using the Model

In some implementations, for each ad "A" on a network of publisher "P" participating in an auction for user "U," the learning model 202 provides a probability that a click will lead to a conversion by the user U for the ad A on publisher P, i.e., P(conversion|click, A, P, U). One feature used to train the learning model 202 may have been the historical conversion rate for ad A on reference publisher P* (e.g., Google.com). This information, however, may not be available when using the learning model 202 (e.g., this particular advertiser might not be advertising on publisher P*). In this case, there are at least 3 possible options: 1) use the exact conversion rate for ad A on publisher P* whenever possible, and use a default (e.g., 0.1) conversion rate otherwise; 2) always use a default conversion rate (e.g., 0.1) for ad A on publisher P*; or 3) use a second learning model to predict a conversion rate for ad A on publisher P* based on various features (minus the conversion rate for publisher P*), and use the output of the second learning model as the conversion rate for ad A on publisher P*. Regardless of which option is used, the result will be an estimate of the conversion rate for ad A on publisher P*, which can be used by the learning model 202 to compute P(conversion|click, a, p, u).

Example Process

Figure 3:
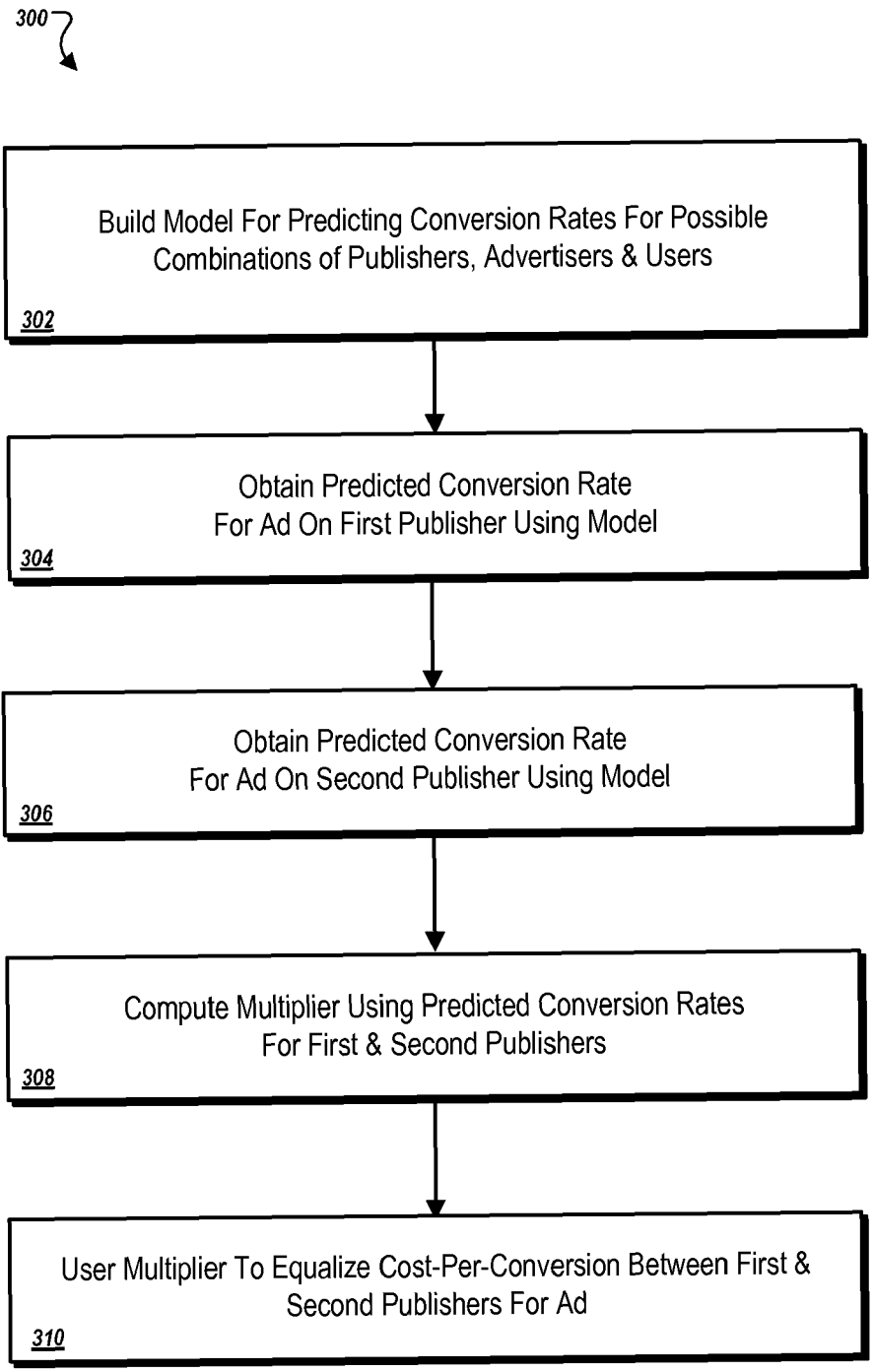
FIG. 3 is a flow diagram of an example process for automatically equalizing cost-per-conversion between publishers.

FIG. 3 is a flow diagram of an example process 300 for automatically equalizing cost-per-conversion between publishers. In some implementations, the process 300 begins by building a learning model (e.g., learning model 202) for predicting conversion rates for possible combinations of publisher, advertiser and user data or features participating in an online advertising system (302). An example of suitable learning models are described in U.S. patent application Ser. No. 10/712,263, for "Targeting Advertisements Based on Predicted Relevance of the Advertisements," and U.S. patent application Ser. No. 11/321,046, for "Predicting Ad Quality." Other known machine learning models can be used, including but not limited to: support vector machines (SVMs), artificial neural networks, decision trees, genetic programming, Gaussian process regression, linear discriminant analysis, K-nearest neighbor, minimum message length, quadratic classifiers, radial basis function networks, etc. The learning model may also use simple historical counts or a constant function.

The learning model can be used to obtain a first predicted conversion rate for a given ad on a first publisher (304). The same learning model, or a different model, can be used to obtain a second predicted conversion rate for the same ad on a second publisher (306). The learning model can be applied to all advertisers (e.g., both conversion-tracked and non-conversion tracked) participating in the online advertising system (e.g., system 100). A publisher network can be any type of network, media channel or web property, such as websites, blogs, videos, digital images, instant messaging, radio or television broadcasts, podcasts, videocasts, etc. In some implementations, raw data (e.g., click and conversion log data) can be used to build the learning model.

The predicted conversion rates can be used to compute a multiplier that can be used to equalize cost-per-conversion among the first and second publishers for the ad (308). In some implementations, the multiplier can be computed from a ratio of the predicted conversion rates for the first and second publishers. The multiplier can then be used to adjust (e.g., automatically) an advertiser's bid (e.g., a maximum CPC bid) to equalize cost-per-conversion among the first and second publishers for the ad (310).

Example System Architecture

Figure 4:
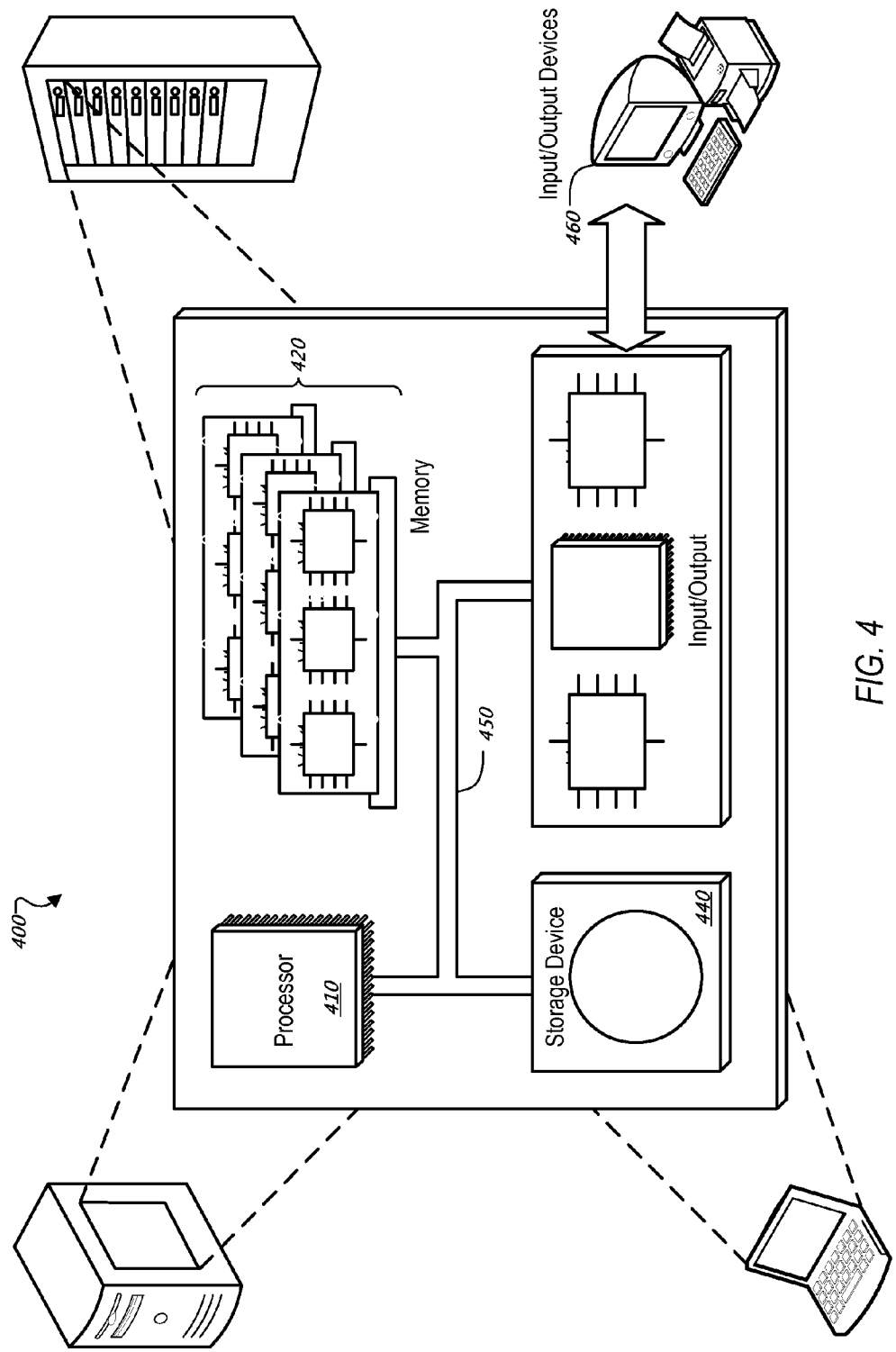
FIG. 4 is a block diagram of an example system architecture for performing the various operations described in reference to FIGS. 1-3.

FIG. 4 is a block diagram of an example system architecture 400 for performing the various operations described in reference to FIGS. 1-3. For example, the system 400 may be included in the system 100, described in reference to FIG. 1. The system 400 includes a processor 410, a memory 420, a storage device 440, and an input/output device 460. Each of the components 410, 420, 440, and 460 are interconnected using a system bus 450. The processor 410 is capable of processing instructions for execution within the system 400. In some implementations, the processor 410 is a single-threaded processor. In other implementations, the processor 410 is a multi-threaded processor. The processor 410 is capable of processing instructions stored in the memory 420 or on the storage device 440 to display graphical information for a user interface on the input/output device 460.

The memory 420 stores information within the system 400. In some implementations, the memory 420 is a computer-readable medium. In other implementations, the memory 420 is a volatile memory unit. In yet other implementations, the memory 420 is a non-volatile memory unit.

The storage device 440 is capable of providing mass storage for the system 400. In some implementations, the storage device 440 is a computer-readable medium. In various different implementations, the storage device 440 may be a floppy disk device, a hard disk device, an optical disk device, or a tape device.

The input/output device 460 provides input/output operations for the system 400. In some implementations, the input/output device 460 includes a keyboard and/or pointing device. In other implementations, the input/output device 460 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
    accessing bid data specifying an advertiser's initial bid for placement of an advertisement on a publisher resource;
    accessing data specifying a first predicted conversion rate for placement of the advertisement on a first publisher resource and a second predicted conversion rate for placement of the advertisement on a second publisher resource different from the first publisher resource;
    determining, by one or more data processors, a multiplier based at least in part on the first and second predicted conversion rates; and
    adjusting, by the one or more data processors, the initial bid for placement of the advertisement on the first publisher resource using the multiplier to equalize a first cost-per-conversion specifying a first predicted cost to realize a conversion from placement of the advertisement on the first publisher resource to a second cost-per-conversion specifying a second predicted cost to realize a conversion from placement of the advertisement on the second publisher resource, wherein:
        the first predicted cost is based on the adjusted bid and the first predicted conversion rate; and
        the second predicted cost is based on the initial bid and the second predicted conversion rate, and the first predicted cost is the same as the second predicted cost.

2. The method of claim 1, wherein determining the multiplier comprises determining the multiplier based at least in part on a ratio of the first predicted conversion rate to the second predicted conversion rate.

3. The method of claim 2, wherein adjusting the initial bid for placement of the advertisement on the first publisher resource comprises decreasing the initial bid for placement of the advertisement on the first publisher resource in response to the first predicted conversion rate being less than the second predicted conversion rate.

4. The method of claim 2, wherein adjusting the initial bid for placement of the advertisement on the first publisher resource comprises increasing the initial bid for placement of the advertisement on the first publisher resource in response to the first predicted conversion rate being greater than the second predicted conversion rate.

5. The method of claim 2, wherein adjusting the initial bid comprises multiplying the initial bid by the multiplier.

6. The method of claim 1, wherein accessing data specifying a first predicted conversion rate and a second predicted conversion rate comprises:
    determining the first predicted conversion rate and the second predicted conversion rate using a learning model developed from a combination of advertiser, publisher and user data.

7. The method of claim 6, further comprising:
    developing the learning model using a historical predicted conversion rate associated with at least one of the first publisher resource or the second publisher resource.

8. The method of claim 1, wherein the advertiser's initial bid is a cost-per-click bid.

9. A computer-implemented method comprising:
    obtaining a first predicted conversion rate for an advertisement appearing on a first publisher property;
    obtaining a second predicted conversion rate for the advertisement appearing on a second different publisher property;
    computing, by one or more data processors, a multiplier using the first and second predicted conversion rates, wherein the multiplier is based at least in part on a function of a probability that a conversion will result from a selection of the advertisement by a user on the first publisher property with respect to a probability that a conversion will result from a selection of the advertisement by a user on the second publisher property; and
    automatically adjusting a bid of an advertiser associated with the advertisement using the multiplier to equalize a cost-per-conversion for the advertisement between the first and second publisher properties.

10. The method of claim 9, wherein the advertiser's bid is a maximum cost-per-click bid.

11. The method of claim 9, where automatically adjusting a bid comprises:
    automatically multiplying the a maximum cost-per-click bid by the multiplier.

12. A non-transitory computer-readable storage medium having instructions stored thereon, which, when executed by one or more processors, causes the one or more processors to perform operations comprising:
    accessing bid data specifying an advertiser's initial bid for placement of an advertisement on a publisher resource;
    accessing data specifying a first predicted conversion rate for placement of the advertisement on a first publisher resource and a second predicted conversion rate for placement of the advertisement on a second publisher resource different from the first publisher resource;

determining a multiplier based at least in part on the first and second predicted conversion rates; and adjusting the initial bid for placement of the advertisement on the first publisher resource using the multiplier to equalize a first cost-per-conversion specifying a first predicted cost to realize a conversion from placement of the advertisement on the first publisher resource to a second cost-per-conversion specifying a second predicted cost to realize a conversion from placement of the advertisement on the second publisher resource, wherein:

the first predicted cost is based on the adjusted bid and the first predicted conversion rate; and the second predicted cost is based on the initial bid and the second predicted conversion rate and the first predicted cost is the same as the second predicted cost.

13. The non-transitory computer-readable storage medium of claim 12, wherein determining the multiplier comprises determining the multiplier based at least in part on a ratio of the first predicted conversion rate to the second predicted conversion rate.

14. The non-transitory computer-readable storage medium of claim 13, wherein adjusting the initial bid for placement of the advertisement on the first publisher resource comprises decreasing the initial bid for placement of the advertisement on the first publisher resource in response to the first predicted conversion rate being less than the second predicted conversion rate.

15. The non-transitory computer-readable storage medium of claim 13, wherein adjusting the initial bid for placement of the advertisement on the first publisher resource comprises increasing the initial bid for placement of the advertisement on the first publisher resource in response to the first predicted conversion rate being greater than the second predicted conversion rate.

16. The non-transitory computer-readable storage medium of claim 13, wherein adjusting the initial bid comprises multiplying the initial bid by the multiplier.

17. The non-transitory computer-readable storage medium of claim 12, wherein the advertiser's initial bid is a cost-per-click bid.

18. A system comprising:

one or more data processors; and software stored on a computer storage apparatus and comprising instructions executable by the one or more data processors and upon such execution cause the one or more data processors to perform operations comprising:

accessing bid data specifying an advertiser's initial bid for placement of an advertisement on a publisher resource;

accessing data specifying a first predicted conversion rate for placement of the advertisement on a first publisher resource and a second predicted conversion rate for placement of the advertisement on a second publisher resource different from the first publisher resource;

determining a multiplier based at least in part on the first and second predicted conversion rates; and adjusting the initial bid for placement of the advertisement on the first publisher resource using the multiplier to equalize a first cost-per-conversion specifying a first predicted cost to realize a conversion from placement of the advertisement on the first publisher resource to a second cost-per-conversion specifying a second predicted cost to realize a conversion from placement of the advertisement on the second publisher resource, wherein:

the first predicted cost is based on the adjusted bid and the first predicted conversion rate; and the second predicted cost is based on the initial bid and the second predicted conversion rate and the first predicted cost is the same as the second predicted cost.

19. The system of claim 18, wherein adjusting the initial bid for placement of the advertisement on the first publisher resource comprises decreasing the initial bid for placement of the advertisement on the first publisher resource in response to the first predicted conversion rate being less than the second predicted conversion rate.

20. The system of claim 18, wherein adjusting the initial bid for placement of the advertisement on the first publisher resource comprises increasing the initial bid for placement of the advertisement on the first publisher resource in response to the first predicted conversion rate being greater than the second predicted conversion rate.

* * * * *